US008907250B2

(12) United States Patent
Bressand et al.

(10) Patent No.: US 8,907,250 B2
(45) Date of Patent: Dec. 9, 2014

(54) PANE WITH HEATABLE OPTICALLY TRANSPARENT SENSOR ARRAY

(75) Inventors: Emily Bressand, Paris (FR); Ilkay Arslan, Aachen (DE); Dirk Wohlfeil, Raeren (BE)

(73) Assignee: Saint-Gobain Glass France, Courbevoie (FR)

(*) Notice: Subject to any disclaimer, the term of this patent is extended or adjusted under 35 U.S.C. 154(b) by 407 days.

(21) Appl. No.: 13/203,958

(22) PCT Filed: Jun. 22, 2010

(86) PCT No.: PCT/EP2010/058805
§ 371 (c)(1),
(2), (4) Date: Jan. 17, 2012

(87) PCT Pub. No.: WO2010/149649
PCT Pub. Date: Dec. 29, 2010

(65) Prior Publication Data
US 2012/0103960 A1 May 3, 2012

(30) Foreign Application Priority Data
Jun. 24, 2009 (DE) .......................... 10 2009 026 021

(51) Int. Cl.
*B60L 1/02* (2006.01)
*H05B 3/84* (2006.01)
*B60R 11/04* (2006.01)
*B21D 39/03* (2006.01)
*B60R 11/00* (2006.01)

(52) U.S. Cl.
CPC *H05B 3/84* (2013.01); *B60R 11/04* (2013.01); *B60R 2011/0026* (2013.01)
USPC .............................. 219/203; 219/214; 29/428

(58) Field of Classification Search
CPC .. B60R 11/04; B60R 2011/0026; H05B 3/84; H05B 3/845; H05B 3/86
See application file for complete search history.

(56) References Cited

U.S. PATENT DOCUMENTS

| 7,700,187 B2* | 4/2010 | Konrad et al. ................ 428/336 |
| 2003/0059218 A1 | 3/2003 | Sakata et al. |
| 2008/0284850 A1* | 11/2008 | Blaesing et al. .............. 348/148 |
| 2010/0006555 A1 | 1/2010 | Maurer et al. |

FOREIGN PATENT DOCUMENTS

| DE | 10156850 | 1/2003 |
| DE | 10 2004 054 161 | 8/2006 |

(Continued)

OTHER PUBLICATIONS

PCT Written Opinion issued for PCT Application No. PCT/EP2010/058805 filed on Jun. 22, 2010 in the name of Saint-Gobain Glass France (German and English).

(Continued)

Primary Examiner — Shawntina Fuqua
(74) Attorney, Agent, or Firm — Steinfl & Bruno LLP

(57) ABSTRACT

A pane having a heatable, optically transparent sensor array comprising at least: a) a pane, b) at least one optically transparent sensor array on the surface of the pane, c) at least one heatable film which is fitted to the optically transparent sensor array, comprising at least: c1) a support film, c2) a heatable coating, printed conductors, meshes and/or heating wires on the support film, d) at least one electrical contact-making means, which is fitted to the heatable coating and/or to the heating wires, and e) encapsulation, which is fitted to the optically transparent sensor array and to the heatable film, and a sensor which is fitted in the encapsulation.

19 Claims, 3 Drawing Sheets

(56) References Cited

FOREIGN PATENT DOCUMENTS

| DE | 10 2007 001 080 | | 7/2008 |
|---|---|---|---|
| EP | 1605729 | * | 12/2005 |
| EP | 1777251 | | 4/2007 |

OTHER PUBLICATIONS

PCT International Search Report issued for PCT Application No. PCT/EP2010/058805 filed on Jun. 22, 2010 in the name of Saint-Gobain Glass France.

* cited by examiner

PANE WITH HEATABLE OPTICALLY TRANSPARENT SENSOR ARRAY

CROSS REFERENCE TO RELATED APPLICATIONS

The present application is the US national stage of International Application PCT/EP2010/058805 filed on Jun. 22, 2010, which, in turn, claims priority to German Patent Application DE 10 2009 026 021.8 filed on Jun. 24, 2009.

FIELD

The invention relates to a pane with a heatable, optically transparent sensor array, a method for production thereof, and use thereof

BACKGROUND

Many motor vehicles, airplanes, helicopters, and ships are equipped with various optical sensors. Examples of optical sensors are camera systems, such as video cameras, night vision cameras, residual light amplifiers, or passive infrared detectors such as FLIR (forward looking infrared). The camera systems can use light in the ultraviolet (UV), visible (VIS), and infrared wavelength range (IR). Thus, they make it possible, even under poor weather conditions, such as darkness and fog, to precisely detect objects, motor vehicles, as well as persons. In motor vehicles, these camera systems can be placed behind the windshield inside the passenger compartment. Thus, they offer the capability of detecting hazardous situations and obstacles in a timely manner even in road traffic.

Other areas that use optical sensors include electronic distance measurement (EDM), for example, using laser distance meters. The distance to other motor vehicles can be determined. Such systems are common in the military field of application, but there are also many possibilities for civilian use. By measurements of the distance to the preceding vehicle, it is possible to determine the necessary safety distance and to significantly increase traffic safety. With automatic warning systems, the danger of a rear-end collision is significantly reduced.

Because of their sensitivity to weather influences or airstreams, such sensors must in all cases be protected by appropriate panes. The sensor can either be installed inside a motor vehicle or outside as in the case of thermal imaging cameras of helicopters. In that case, the sensor is installed in a pivotable housing outside on the helicopter. In order to ensure optimum functioning of the optical sensor, with both options, clean, condensation-free panes are absolutely essential. Condensation and icing significantly interfere with functioning, since they significantly reduce the transmission of electromagnetic radiation. Whereas wiper systems can be used for drops of water and dirt particles, these are usually inadequate with icing. Systems that heat the segment of the pane associated with the sensor at least briefly as needed and thus enable uninterrupted use are essential. In order to keep energy consumption and the voltage needed low, only the field of vision of the pane necessary for the sensor should be heated in this manner.

Besides the external surface of the pane, the inside pane must, above all, be kept free of condensation. So that no dirt and dust particles foul the sensors, the sensor and pane arrangement are usually encapsulated. If moisture penetrates into this encapsulated space, this moisture can, especially with cold outside temperatures, condense on the inside of the pane and restrict the functionality of the sensor.

DE 10 2007 001 080 A1 discloses an electrically heatable window pane. This is supplied with current using electrical bus bars and thus heated. The arrangement of the bus bars is such that only small electromagnetic fields are developed. Thus, operation of devices that react sensitively to electromagnetic fields is possible even in the region of the pane.

DE 101 56 850 A1 discloses a sensor in a motor vehicle window pane, whose lens is sealed off from the motor vehicle interior by encapsulation. This configuration prevents the deposition of dust particles on the lens. A particle filter is provided for air exchange.

DE 10 2004 054 161 A1 discloses an infrared light detection area in a motor vehicle windshield. The infrared light detection area is surrounded by heating elements that keep it ice and condensation free by heat conduction. EP 1 605 729 A2 discloses an electrically heatable pane with a camera window. This camera window is kept condensation and ice free by means of a heating device. The heating element is laminated into the pane at the position of the camera window. In addition, another additional heating element can be applied on the pane surface. The additional heating element is preferably printed onto the pane surface as a conductive paste.

SUMMARY

The object of the invention is to provide a pane with a heatable, optically transparent sensor array that can be produced easily from finished, standardized panes without major modifications.

The object of the present invention is accomplished according to the invention by a pane with a heatable, optically transparent sensor array, a method for production thereof, and use thereof according to the independent claims 1, 14, and 15. Preferred embodiments emerge from the subclaims.

The pane with a heatable, optically transparent sensor array comprises at least a pane and at least an optically transparent sensor array. In the context of the invention, the expression "optically transparent sensor array" refers to the part of the pane that supplies the sensor with the relevant optical and electromagnetic data or signals. This can be any part of the pane or an inserted pane segment that has high transmission for the relevant optical and electromagnetic signals. The characteristic "optically transparent" refers, in the context of the invention, to the wavelength range from 200 nm to 2000 nm, preferably 400 nm to 1300 nm. The transmission is preferably more than 70% in the wavelength range from 400 nm to 1300 nm.

The optically transparent sensor array preferably occupies less than 10%, particularly preferably less than 5% of the surface of the pane. The heatable film arranged on the optically transparent sensor array comprises at least a support film, a heatable coating, printed conductors (e.g., screen printing or inkjet printing), meshes (e.g., a copper coating structured by etching), and/or heating wires as well as an electrical contacting means affixed on the heatable coating, printed conductors, meshes, and/or the heating wires. In the context of the invention, the heatable coating, printed conductors, meshes, and/or the heating wires can be affixed both on the side of the support film facing the pane and also and/or on the side of the support film turned away from the pane. The support film preferably has a thickness of 20 nm to 500 nm, particularly preferably from 30 nm to 200 nm. The heatable coating, printed conductors, meshes, and/or heating wires function as electrical resistors and are affixed directly on the film. The layer thickness or wire thickness is defined based on the necessary heat output. The heating wires preferably have a thickness of 10 nm to 100 nm; the electrical coating preferably has a sheet resistance of 0.5 ohms per square to 3 ohms per square, with a voltage of 12 V to 15 V. The averaged transmission of the entire arrangement of sensor array and heatable film is preferably more than 60%, particularly preferably more than 70%.

An encapsulation and a sensor affixed in the encapsulation are mounted on the optically transparent sensor array and the heatable film. The encapsulation protects the sensor from dirt and dust particles as well as unwanted incidence of light. The encapsulation is preferably arranged in the upper region of the pane, preferably not farther than 30% of the height of the pane from the top and/or bottom edge. The encapsulation preferably contains a polymer, particularly preferably polybutylene terephthalate, polyamides, polycarbonate, polyurethanes, polybutylene, polypropylene, polyethylene, polyethylene terephthalate, polyvinyl chloride, polystyrene, acrylonitrile butadiene styrene, ethylene vinyl acetate, ethylene vinyl alcohol, polyimides, polyester, polyketones, polyether ether ketones, and/or polymethyl methacrylate, as well as mixtures, block polymers, and copolymers thereof.

The sensor preferably comprises cameras for visible light of wavelengths from 400 nm to 800 nm and infrared light of wavelengths from 800 nm to 1300 nm.

The pane preferably contains glass and/or polymers, preferably flat glass, float glass, quartz glass, borosilicate glass, soda lime glass, polymethyl methacrylate, and/or mixtures thereof. The pane preferably comprises single plane safety glass (SPSG) or a laminated safety glass (LSG).

The sensor array preferably has an optical transparency for visible light (VIS) and/or infrared radiation (IR) of >60%, preferably >70%.

The sensor array preferably has an opaque and/or colored edge. The edge can be configured both as edge strips or as an edge region.

The support film preferably contains polybutylene terephthalate (PBT), polycarbonate (PC), polyethylene terephthalate (PET), polyethylene naphthalate (PEN), polyvinyl butyral (PVB), and/or poly ethyl vinyl acetate (EVA), and/or mixtures and/or copolymers thereof.

The support film preferably has an optical transparency for visible light (VIS) and/or infrared irradiation (IR) of >80%, particularly preferably >90%.

The heatable coating and/or the heating wires preferably contain fluorine doped tin dioxide ($F:SnO_2$), tin doped indium oxide (ITO), silver, copper, tin, gold, aluminum, iron, tungsten, chromium, or alloys thereof and/or at least one electrically conductive organic polymer.

The heatable coating preferably has a layer thickness of 0.1 µm to 50 µm, particularly preferably 1 µm to 10 µm.

The electrical contacting means preferably contains silver, copper, tin, gold, aluminum, iron, tungsten, chromium, or alloys thereof and/or at least one electrically conductive organic polymer.

The heatable film preferably contains an optically transparent antistatic, water absorbing, hydrophilic, hydrophobic, or lipophobic and hydrophobic coating. Examples of hydrophilic coatings of polyester films are found in EP 1 777 251 A1. Coating solutions for hydrophilic coatings contain, for example, sulfopolyester of 90 mol-% isophthalic acid and 10 mol-% sodium sulfoisophthalic acid as well as a surface active agent such as diethylhexyl sulfosuccinate-sodium salt (AOT) with, in each case, 1 wt.-% to 5 wt.-%. Coatings with halogenated hydrocarbons, in particular with —CHF—, —$CF_2$—, and —$CF_3$ groups make possible a coating that is both lipophobic, repelling fat or nonpolar hydrocarbons, and also hydrophobic, repelling water. Water absorbing coatings include, for example, swellable hydrophilic polymers such as polysaccharides, cellulose derivatives, and polyethylene oxides.

The heatable film preferably contains an adhesive, preferably acrylate adhesives, methyl methacrylate adhesives, cyanoacrylate adhesives, polyepoxies, silicone adhesives, and/or silane-cross-linking polymer adhesives as well as mixtures and/or copolymers thereof. The heatable film preferably contains a self-adhesive film.

The encapsulation is preferably affixed in the upper region of the windshield and/or the rear window, particularly preferably behind a cover strip, a sun visor, and/or a band filter. In this configuration, a recess is preferably arranged for the optically transparent sensor array.

The encapsulation preferably contains water absorbing materials or desiccants, particularly preferably silica gel, $CaCl_2$, activated charcoal, silicates, bentonites, zeolites, and/or mixtures thereof. The desiccants can be incorporated into the surface of the encapsulation and/or arranged in open receptacles in the encapsulation. The desiccants are preferably arranged such that air and moisture exchange with the air in the interior of the encapsulation is possible, but the materials cannot fly around and are affixed. This can preferably occur by enclosing the desiccants in an air and moisture permeable polymer film or in a fine-meshed net. The invention further includes a method for producing a pane with a heatable, optically transparent sensor array. In a first step, the support film is provided with a heatable coating, printed conductors, meshes, and/or heating wires. The heatable film obtained is mounted on a sensor array of a pane. The attachment of the heatable film preferably occurs as self-adhesive film or using an optically transparent adhesive. A cover layer made of a polymer film is preferably applied on the heatable film. The cover layer preferably contains PVB, EVA, PET, and/or mixtures thereof. The cover layer is preferably arranged overhangingly, such that the support film and the heatable coating are laminated onto the pane surface using the cover layer.

The invention further includes the use of the pane with a heatable, optically transparent sensor array according to the invention in motor vehicles, ships, airplanes, and helicopters. The pane with a heatable, optically transparent sensor array is preferably used as a windshield and/or rear window of a motor vehicle.

BRIEF DESCRIPTION OF THE DRAWINGS

In the following, the invention is explained in detail with reference to a drawing. The drawing in no way restricts the invention.

The figures depict.

DESCRIPTION OF EXAMPLE EMBODIMENTS

Figure 1:
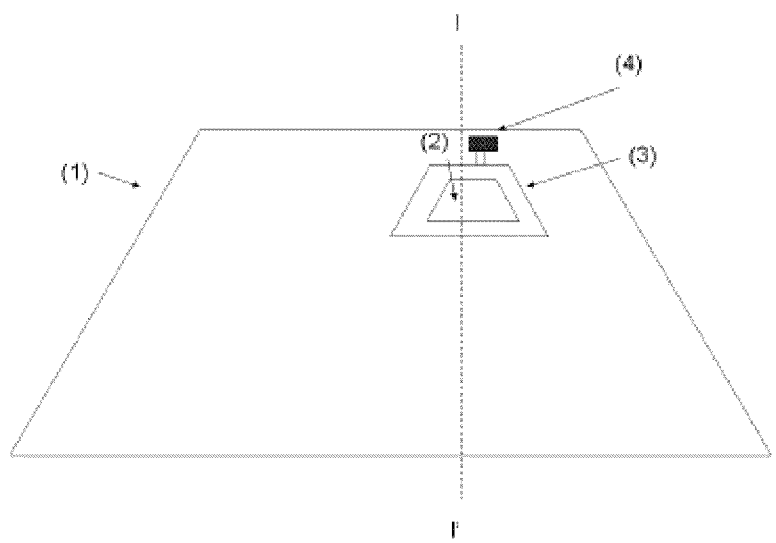
FIG. 1 a plan view of the pane (1) according to the invention.

FIG. 1 depicts a plan view of the pane (1) according to the invention. A heatable film (3) is arranged on an optically transparent sensor array (2). The optically transparent sensor array (2) comprises the part of the pane (1) that supplies the sensor (7) depicted in FIG. 2 with the relevant optical and electromagnetic data or signals. This can be any part of the pane (1) or an inserted pane segment that has high transmission for the relevant optical and electromagnetic signals. The heatable film (3) is connected to an electrical contacting means (4) that is connected to a power source, for example, an automobile battery.

Figure 2:
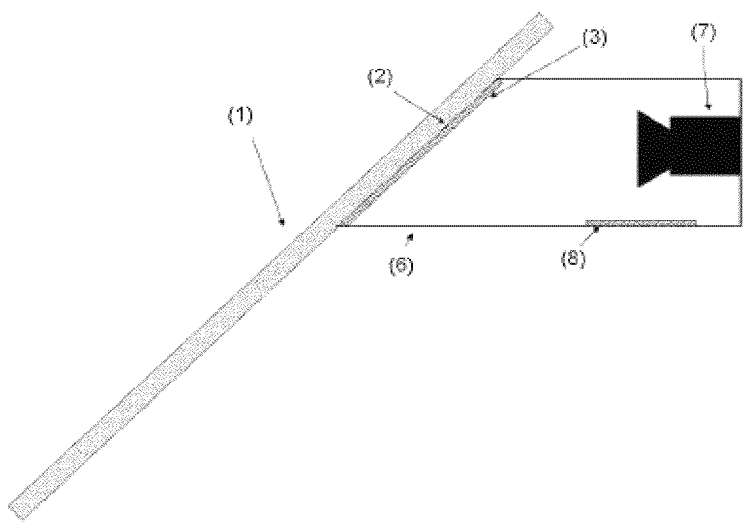
FIG. 2 a cross-section of a preferred embodiment of the pane (1) with a heatable, optically transparent sensor array (2) according to the invention, FIG. 3 a cross-section of the heatable, optically transparent sensor array (2), FIG. 4 another cross-section of the heatable, optically transparent sensor array (2), and FIG. 5 a cross-section of a preferred embodiment of the heatable, optically transparent sensor array (2).

FIG. 2 depicts a cross-section along the height of the pane I to I' in FIG. 1 of a preferred embodiment of the pane (1) according to the invention with a heatable, optically transparent sensor array (2). In the region of the optically transparent sensor array (2), a heatable film (3) is arranged on the interior side of the pane (1). The sensor (7) oriented toward the optically transparent sensor array (2) is located inside an encapsulation (6) mounted on the optically transparent sensor array (2). Desiccants (8) are arranged inside the encapsulation (6). The desiccants (8) are preferably incorporated into the surface of the encapsulation (6).

Figure 3:
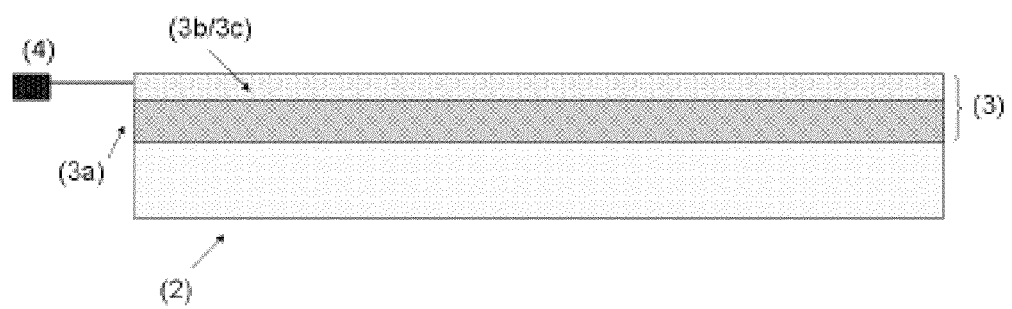

FIG. 3 depicts a cross-section of the heatable, optically transparent sensor array (2). The heatable film (3) is arranged with the electrical contacting means (4) on the optically transparent sensor array (2). The heatable film (3) comprises a support film (3a) and, on the side of the support film (3a) turned away from the optically transparent sensor array (2), a heatable coating (3b) and/or heating wires (3c). These can be applied with conventional techniques such as chemical vapor deposition (CVD) or physical vapor deposition (PVD), such as cathodic sputtering (sputtering).

Figure 4:
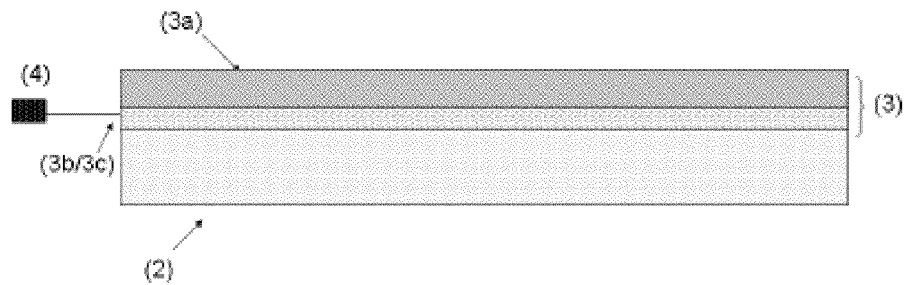

FIG. 4 depicts a cross-section of another embodiment of the heatable, optically transparent sensor array (2). The heatable film (3) with the electrical contacting means (4) is arranged on the optically transparent sensor array (2). The heatable film (3) comprises a support film (3a) and, on the side of the support film (3a) facing the optically transparent sensor array (2), a heatable coating (3b) and/or heating wires (3c). These can be applied with conventional techniques such as chemical vapor deposition (CVD) or physical vapor deposition (PVD), such as cathodic sputtering (sputtering).

Figure 5:
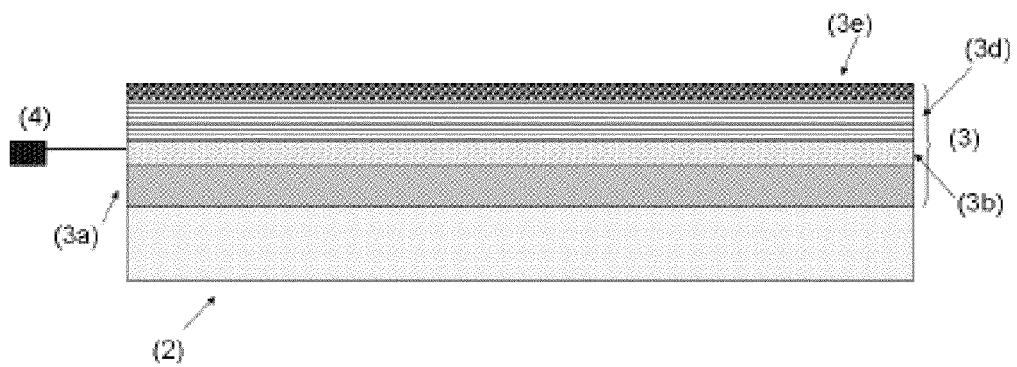

FIG. 5 depicts a cross-section of a preferred embodiment of the heatable, optically transparent sensor array (2). The heatable film (3) with the electrical contacting means (4) is arranged on the optical pane segment. The heatable film (3) comprises a support film (3a) and a heatable coating (3b) and/or heating wires (3c). A cover layer (3d) made of a polymer film is arranged on the heatable coating (3b) and/or heating wires (3c). The cover layer (3d) is preferably arranged overhangingly, such that the support film (3a) and the heatable coating (3b) are laminated and affixed over the cover layer (3d) on the pane surface (1, 2). The cover layer (3d) contains an antistatic, hydrophilic, hydrophobic, or lipophobic and hydrophobic coating (3e).

The invention claimed is:

1. A pane with a heatable, optically transparent sensor array comprising:
   a pane, the pane comprising a finished and standardized optically transparent window or windshield component of a vehicle for use in one or more of land, sea or air environments, the pane component comprising at least one of an optically sensitive part thereof, which comprises an optically sensitive segment inserted therein,
   wherein the optically sensitive segment of the pane comprises at least one optically transparent sensor array operable for sensing and passing, with a high transmittance, one or more of optical or infrared electromagnetic data or signals, which are incident to or impinge on a surface of the pane;
   at least one heatable film affixed to the optically transparent sensor array, the heatable film comprising:
       a support film, and
       a heatable coating, printed conductors, meshes, and/or heating wires on the support film;
   at least one electrical contacting means affixed to the heatable coating and/or to the heating wires; and
   an encapsulation affixed to the optically transparent sensor array and to the heatable film, and a sensor affixed in the encapsulation.

2. The pane according to claim 1, wherein the pane comprises glass and/or polymers, such as flat glass, float glass, quartz glass, borosilicate glass, soda lime glass, or polymethyl methacrylate, and/or mixtures thereof.

3. The pane according to claim 1, wherein the sensor array has an optical transparency for visible light and/or infrared radiation of >60%, or >70%.

4. The pane according to claim 1, wherein the sensor array has an opaque and/or colored edge.

5. The pane according to claim 1, wherein the support film comprises polybutylene terephthalate, polycarbonate, polyethylene terephthalate, polyethylene naphthalate, polyvinyl butyral, and/or poly ethyl vinyl acetate, mixtures, block copolymers, and/or copolymers thereof.

6. The pane according to claim 1, wherein the support film has an optical transparency for visible light and/or infrared radiation of >80% or >90%.

7. The pane according to claim 1, wherein the heatable coating and/or the heating wires comprise fluorine doped tin dioxide, tin doped indium oxide, silver, copper, tin, gold, aluminum, iron, tungsten, chromium, or alloys thereof and/or a conductive organic polymer.

8. The pane according to claim 1, wherein the heatable coating has a layer thickness of 0.1 µm to 50 µm or 1 µm to 10 µm.

9. The pane according to claim 1, wherein the electrical contacting means comprises silver, copper, tin, gold, aluminum, iron, tungsten, chromium, and/or alloys thereof and/or a conductive organic polymer.

10. The pane according to claim 1, wherein the heatable film comprises an antistatic, water absorbing, hydrophilic, hydrophobic, or lipophobic and hydrophobic coating.

11. The pane according to claim 1, wherein the heatable film comprises an adhesive, such as acrylate adhesives, methyl methacrylate adhesives, cyanoacrylate adhesives, polyepoxies, silicone adhesives, and/or silane-cross-linking polymer adhesives as well as mixtures and/or copolymers thereof.

12. The pane according to claim 1, wherein the encapsulation is arranged in the upper region of the pane.

13. The pane according to claim 1, wherein the encapsulation comprises desiccants, such as silica gel, $CaCl_2$, activated charcoal, silicates, bentonites, zeolites, and/or mixtures thereof.

14. A method for producing a pane with a heatable, optically transparent sensor array, comprising:
   affixing a heatable film comprising a support film with a heatable coating, printed conductors, meshes and/or heating wires, on the sensor array on a surface of the pane;
   providing the heatable film with electrical contacting means; and
   affixing an encapsulation with a sensor on the heatable film, wherein the pane comprises:

a pane, the pane comprising a finished and standardized optically transparent window or windshield component of a vehicle for use in one or more of land, sea or air environments, the pane component comprising an optically sensitive part thereof, which comprises an optically sensitive segment inserted therein, wherein the optically sensitive part or segment of the pane comprises at least one optically transparent sensor array operable for sensing and passing, with a high transmittance, one or more of optical or infrared electromagnetic data or signals, which are incident to or impinge on a surface of the pane;

the heatable film, wherein the heatable film is affixed to the optically transparent sensor array, and comprises:
a support film, and
a heatable coating, printed conductors, meshes, and/or heating wires on the support film;

the electrical contacting means, wherein the electrical contacting means is affixed to the heatable coating and/or to the heating wires; and the encapsulation, wherein the encapsulation is affixed to the optically transparent sensor array and to the heatable film, and a sensor affixed in the encapsulation.

15. A method for providing the pane with the heatable, optically transparent sensor array according to claim 1, the method comprising installing the pane with the heatable, optically transparent sensor array in one or more of: motor vehicles, ships, airplanes, and helicopters, as at least one of a windshield or a rear window therein.

16. The pane according to claim 12, wherein the encapsulation is arranged behind a cover strip.

17. The pane according to claim 1, wherein the at least one optically transparent sensor array comprises a part of the pane that supplies the sensor with one or more relevant optical and electromagnetic data or signals, which the optically transmissive sensor array is substantially transmissive thereto.

18. A window pane product, comprising:
a pane, the pane comprising a finished and standardized optically transparent window or windshield component of a vehicle for use in one or more of land, sea or air environments, the pane component comprising at least one of an optically sensitive part thereof, which optically sensitive segment is inserted therein, wherein the optically sensitive part or segment of the pane comprises at least one optically transparent sensor array operable for sensing and passing, with a high transmittance, one or more of optical or infrared electromagnetic data or signals, which are incident to or impinge on a the surface of the pane;

at least one heatable film affixed to the optically transparent sensor array, the heatable film comprising:
a support film, and
a heatable coating, printed conductors, meshes, and/or heating wires on the support film;

at least one electrical contacting means affixed to the heatable coating and/or to the heating wires; and an encapsulation affixed to the optically transparent sensor array and to the heatable film, and a sensor affixed in the encapsulation;

wherein the optically transmissive sensor array component has high transmissivity characteristics over one or more optical or electromagnetic wavelength ranges;

wherein the heatable coating component is disposed over the optically transmissive sensor array, wherein the optically transmissive sensor array is disposed in relation to a sensor, which is sensitive over at least one of the one or more optical or electromagnetic wavelength ranges, and wherein the sensor is supplied with a relevant optical or electromagnetic signal or data by the optically transmissive sensor array component.

19. The window pane product according to claim 18, wherein the sensor is disposed in an encapsulation, which is disposed upon a planar surface of a portion of the window pane product proximate to an area thereof corresponding to the optically transparent sensor array component.

\* \* \* \* \*